US012754278B2

(12) United States Patent
Knorr

(10) Patent No.: US 12,754,278 B2
(45) Date of Patent: Oct. 6, 2026

(54) MARKING AND METHOD FOR POSITION DETERMINATION, AND ASSOCIATED CAMERA SYSTEM

(71) Applicant: Robert Bosch GmbH, Stuttgart (DE)

(72) Inventor: Moritz Michael Knorr, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 18/730,819

(22) PCT Filed: Jan. 30, 2023

(86) PCT No.: PCT/EP2023/052175
§ 371 (c)(1),
(2) Date: Jul. 22, 2024

(87) PCT Pub. No.: WO2023/151975
PCT Pub. Date: Aug. 17, 2023

(65) Prior Publication Data

US 2025/0102614 A1 Mar. 27, 2025

(30) Foreign Application Priority Data

Feb. 9, 2022 (DE) ..................... 10 2022 201 316.6

(51) Int. Cl.

| | |
|---|---|
| ***G01S 5/16*** | (2006.01) |
| ***G01S 3/782*** | (2006.01) |
| ***G06V 10/24*** | (2022.01) |

(52) U.S. Cl.
CPC .............. *G01S 5/163* (2013.01); *G01S 3/782* (2013.01); *G06V 10/245* (2022.01)

(58) Field of Classification Search
CPC G01S 5/163; G01S 3/782; G01S 5/16; G06V 10/245; G01B 11/002; G01B 11/26
See application file for complete search history.

(56) References Cited

U.S. PATENT DOCUMENTS

| | | | | |
|---|---|---|---|---|
| 5,521,843 A | 5/1996 | Hashima et al. | | |
| 6,408,106 B1 * | 6/2002 | Tatsuta | G06V 10/421 382/305 | |

(Continued)

FOREIGN PATENT DOCUMENTS

| | | | |
|---|---|---|---|
| DE | 102009059823 | A1 | 4/2011 |
| DE | 102014211106 | A1 | 12/2015 |
| WO | 2013171069 | A1 | 11/2013 |

OTHER PUBLICATIONS

International Search Report for PCT/EP2023/052175, Issued Apr. 24, 2023.

*Primary Examiner* — Tony Ko
(74) *Attorney, Agent, or Firm* — Norton Rose Fulbright US LLP

(57) ABSTRACT

A marking for position determination. The marking includes an indicator surface which is arranged at least partially in a first plane and on which a large number of different indicators is arranged, and a viewing area which is arranged in a second plane located in front of the first plane in an intended viewing direction and which is configured in such a way that it defines a viewing point through which the indicator surface in the first plane is to be viewed in order to read an indicator from the large number of different indicators. An associated camera system and an associated positioning system are also described.

12 Claims, 3 Drawing Sheets

(56) References Cited

U.S. PATENT DOCUMENTS

| | | | |
|---|---|---|---|
| 2008/0289202 | A1 | 11/2008 | Kassouf et al. |
| 2014/0372028 | A1 | 12/2014 | Wang et al. |

* cited by examiner

MARKING AND METHOD FOR POSITION DETERMINATION, AND ASSOCIATED CAMERA SYSTEM

FIELD

The present invention relates to a marking for position determination and to an associated method for position determination.

BACKGROUND INFORMATION

Passive optical markers are often used to localize vehicles or robots in underground garages or in warehouses. If they are calibrated and the information is provided, they allow an associated camera system to localize itself. However, this usually requires a plurality of visible markings in a favorable constellation, which markings can be recorded by the camera system. For example, perspective effects are often very weak and do not make accurate position estimation possible. A calibrated camera system is therefore required for the localization. This means that the imaging properties of the camera must be known exactly in order to make position determination possible.

In other methods for position determination, ultrasonic signals or radio signals are often emitted and used for position determination by a receiver. Also conventional are map-based position determinations on the basis of cameras or LiDAR systems. However, they require temporal consistency of the scene contents or at least parts thereof. Calibration of the sensor system is also required here. In industrial environments, robots are also often localized by visible or invisible continuous floor markings or transponders embedded in the floor.

German Patent Application No. DE 10 20 1421 1106 A1 describes a marking that makes position determination possible on the basis of angle information.

SUMMARY

A marking for position determination according to an example embodiment of the present invention comprises an indicator surface which is arranged at least partially in a first plane and on which a large number of different indicators is arranged, and a viewing area which is arranged in a second plane located in front of the first plane in an intended viewing direction and which is designed in such a way that it defines a viewing point through which the indicator surface in the first plane is to be viewed in order to read an indicator from the large number of different indicators.

A method for position determination according to an example embodiment of the present invention comprises reading an indicator from an indicator surface which is arranged at least partially in a first plane and on which a large number of different indicators is arranged, wherein the indicator is read through a viewing area which is arranged in a second plane located in front of the first plane in an intended viewing direction and which is designed in such a way that it defines a viewing point through which the indicator surface in the first plane is to be viewed in order to show the indicator from the large number of different indicators.

In the method according to an example embodiment of the present invention, the indicator is preferably read by means of a camera. Furthermore, the position of the camera is preferably deduced from the read indicator, with different indicators being assigned different positions.

Using the marking for position determination according to the present invention for a position determination is also advantageous.

The camera system according to an example embodiment of the present invention is configured to record the marking according to the present invention and comprises a position determination unit which is configured to read an indicator, located at the viewing point, from the indicator surface through the viewing area of the marking and to ascertain a relative position of the camera system with respect to the marking from the read indicator.

The viewing area is thus a defined area in the second plane, which area is in particular defined by lateral boundaries. The viewing area is a transparent area in the first plane. If the marking is viewed from the intended viewing direction, the indicator surface arranged in the first plane is viewed through the viewing area and defines a viewing point located on the indicator surface. The viewing point depends on a relative position of a viewer with respect to the marking.

The areas of the indicator surface that are remote from the viewing point are either obscured by a covering located in the first plane or can be ignored. Thus, when the marking is viewed in the intended viewing direction, a portion of the indicator surface and the indicator(s) of the large number of different indicators that is/are located in this portion become(s) visible through the viewing area. Depending on a pose of a viewer with respect to the marking, only a partial portion of the indicator surface is thus visible or only a partial portion of the indicator surface is marked as relevant. By means of the viewing area, an indicator from the different indicators of the indicator surface is thus identified.

According to an example embodiment of the present invention, the large number of different indicators is preferably distributed evenly over the indicator surface, wherein each of the different indicators is preferably represented only once on the indicator surface. The indicators are preferably arranged on the indicator surface such that at least one of the indicators is visible in the viewing area when the marking is viewed or recorded from an intended viewing direction.

Instead of discrete indicators, any pattern, which must however be unambiguous and known, can be used. This can, for example, be a (pseudo-) random pattern. Each section of the pattern should be unique. Such a random pattern could be generated, for example, by a noise function such as Perlin noise. Portions of such a pattern can be considered as individual indicators.

A method and a plurality of example embodiments of an apparatus of the present invention for position determination/localization and/or orientation determination are thus described. The functional principle is the opposite of a camera, which observes a robot and derives its position, for example in a plane, from its position in the image. Depending on the perspective from which the marking is observed, different sections of the indicator surface are visible. The position/orientation of the observer can be deduced therefrom. By using magnifying optics, the resolution/accuracy in relation to the installation space/depth of the marking can be controlled/improved.

The proposed marking can be used in many scenarios where traditional markers/markings are used nowadays. In order to determine the orientation/position on the basis of traditional markers, the markers typically have to be relatively large or a plurality of them must be used. At the same time, the camera used must be calibrated to be sufficiently accurate to be able to carry out 3D pose estimation. In contrast, using the marking according to the present invention does not require any calibration. For determining the position in a plane, a known camera height (or a constant camera height) is preferably required. Similarly as in the case of markers/markings, some meta-information, such as the location in space or the appearance and the properties of the markers, is required. However, the system itself is completely passive.

Preferred developments of the present invention are disclosed herein.

According to an example embodiment of the present invention, a lens is preferably arranged in the viewing area. In particular, the entire viewing area is formed by a lens, which is located in the second plane. If the viewing area is viewed from the intended viewing direction, the indicator on the indicator surface that is visible through the viewing area is shown and its representation enlarged through the lens. When viewing the viewing area of the marking, a focus is directed to the viewing point. This makes it possible for the indicators to be represented on the indicator surface so as to be particularly small, since they are magnified by the lens when the marking is read. The lens can therefore also be referred to as a magnifying lens.

Furthermore, according to an example embodiment of the present invention, it is advantageous if the viewing area is an opening located in the second plane, or a transparent area of a non-transparent or partially transparent cover that is located in the second plane. The non-transparent or partially transparent cover thus obscures a part of the indicator surface that is not visible through the viewing area. This avoids indicators that are not within the viewing area being read when the marking is viewed. It is also advantageous if the viewing area is a marked area of a transparent cover located in the second plane. In this way, the amount of light incident onto the indicator surface can be increased, making the marking easier to read in daylight. The markings, which are arranged on the transparent cover, mark the viewing area and show where the viewing point is located in the first plane.

According to an example embodiment of the present invention, it is advantageous if the cover comprises a Fresnel lens on which the viewing area is marked. The Fresnel lens is not necessarily limited to the viewing area but has its optical axis within the viewing area. This makes it possible to dispense with a complex arrangement of a lens in the second plane, since the entire cover, including the viewing area, is created by the Fresnel lens.

According to an example embodiment of the present invention, it is also advantageous if the indicator surface has a curvature so that an outer region of the indicator surface is arranged closer to the second plane than an inner region of the indicator surface is. The indicator surface is curved along only one axis or along two axes that are perpendicular to one another and lie in the first plane. In other words, this means that the indicator surface is preferably curved around an axis or around a point. It can thus be achieved that the indicators are arranged on the indicator surface such that they are aligned toward the viewer when viewing the marking. In other words, this means that an oblique viewing angle toward the indicators is avoided when the indicators are viewed through the viewing area. The readability of the marking is thus increased.

Furthermore, according to an example embodiment of the present invention, it is advantageous if the marking comprises a lighting means which is arranged to illuminate the indicator surface. This makes position determination in a dark environment possible, wherein unwanted illumination of an associated space is avoided, in particular if a non-transparent cover is arranged in the second plane.

The position determination unit of the camera system according to the present invention preferably comprises an image analysis unit by which the images recorded by the camera system are analyzed. In particular, a position of the marking itself is first recognized and the viewing area of the marking is then analyzed. The indicator of the indicator surface that lies in the viewing area is read and recorded as a parameter. In order to ascertain the relative position of the camera system with respect to the marking from the read indicator, it is advantageous if each of the indicators is assigned a position, in particular a relative position with respect to the marking. On the basis of the read indicator, the relative position with respect to the marking can thus be deduced directly.

According to an example embodiment of the present invention, it is advantageous if the position determination unit is configured to ascertain the relative position of the camera system with respect to the marking in the form of a specified plane on the basis of the read indicator, wherein different indicators of the indicator surface are assigned to different points on the specified plane. The specified plane is in particular a floor surface in a room or a plane parallel to a floor surface in a room in which a camera of the camera system is arranged. For this purpose, one of the indicators is preferably assigned to each point in the specified plane.

Furthermore, according to an example embodiment of the present invention, it is advantageous if the camera system is configured to record a plurality of the markings according to the present invention, and the position determination unit is configured to ascertain the relative position of the camera system with respect to the markings on the basis of the read indicators of the markings. Preferably, each combination of two indicators of the different markings is in each case assigned a point in a three-dimensional space. This makes it possible to create a three-dimensional position determination unit.

Also advantageous according to an example embodiment of the present invention is a positioning system which comprises at least one marking according to the present invention and one camera system according to the present invention. Such a positioning system has all the advantages of the marking and of the camera system.

The aforementioned advantages also apply accordingly to a method for position determination according to the present invention. According to an example embodiment of the present invention, the method comprises the step of reading an indicator from an indicator surface which is arranged at least partially in a first plane and on which a large number of different indicators is arranged. Here, the indicator is read through a viewing area which is arranged in a second plane located in front of the first plane in an intended viewing direction and is designed in such a way that it defines a viewing point through which the indicator surface in the first plane is to be viewed in order to show the indicator from the large number of different indicators.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
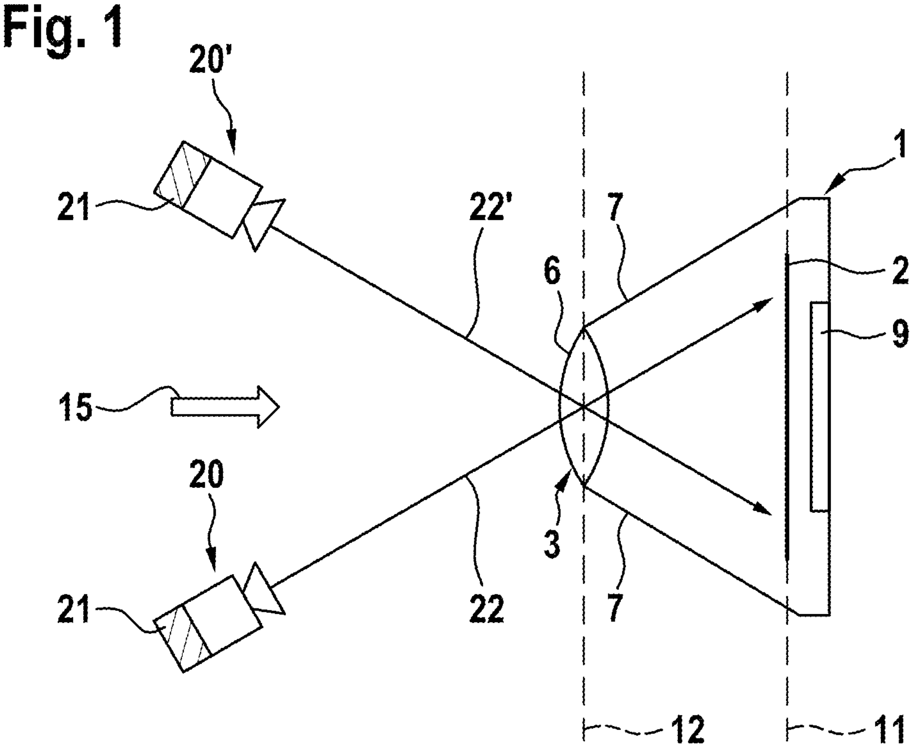
FIG. 1 shows a schematic representation of a marking according to an example embodiment of the present invention in a sectional view.

FIG. 1 shows a marking 1 according to the present invention in a sectional view. An arrangement of a camera system 20, 20' at different positions with respect to the marking 1 is shown. A direction of view of the camera system 20, 20' is aligned along a visual axis 22, 22'.

The marking 1 extends over a first plane 11 and a second plane 12 parallel to the first plane 11. In the first plane 11, an indicator surface 2 is arranged, which in this embodiment is located entirely in the first plane 11. A large number of different indicators 5*a*, 5*b*, 5*c*, etc. is arranged on the indicator surface 2.

Figure 2:
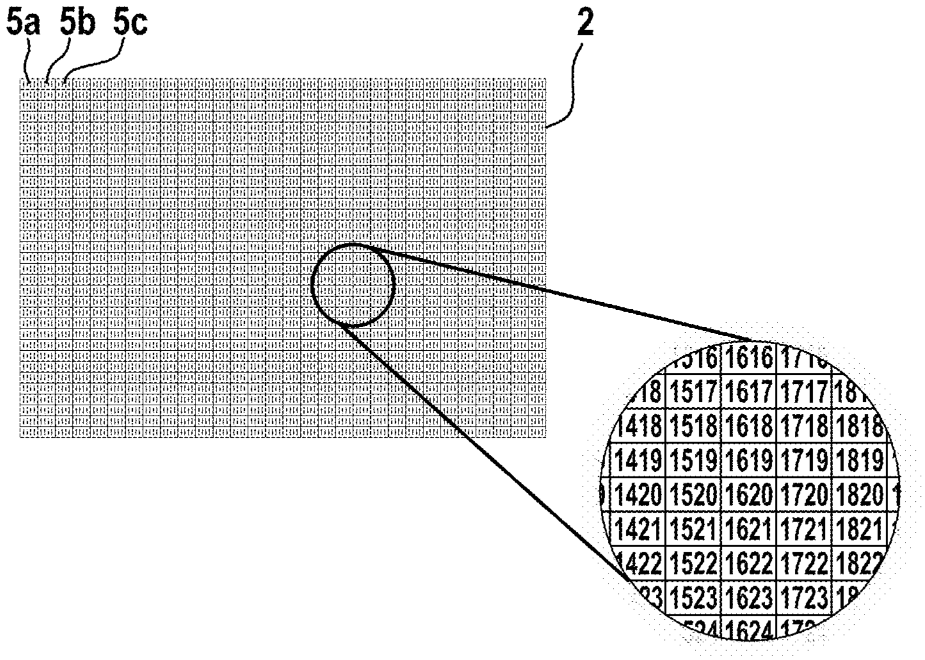
FIG. 2 shows an exemplary representation of an indicator surface with a large number of different indicators, according to the present invention.

The indicator surface 2 is shown by way of example in FIG. 2. The large number of different indicators 5*a*, 5*b*, 5*c* are formed by different numbers. The indicator surface 2 is thus divided into a grid, and a number that is only represented once on the indicator surface 2 is arranged in each field of the grid. On the basis of the number, it can thus be recognized where the number is located on the indicator surface 2. The indicators 5*a*, 5*b*, 5*c* of the indicator surface 2 are selected here as numbers by way of example. In alternative embodiments, they can also be formed by different patterns or colors. In addition, a combination of these indicators is advantageous. For example, the numbers can be highlighted in different colors in order to increase recognition reliability. It is also advantageous if each of the indicators has a predefined orientation on the indicator surface 2. This makes it possible to deduce a rotation of the camera system with respect to the marking 1.

The second plane is located in front of the first plane 11 in an intended viewing direction 15. It is thus provided that the marking 1 is viewed from the left, as shown in FIG. 1. A viewing area is arranged in the second plane 12. This viewing area is designed in such a way that it defines a viewing point 4 through which an indicator 13 on the indicator surface in the first plane is shown. When viewing the marking 1, an indicator 13 from the large number of different indicators 5*a*, 5*b*, 5*c* can thus be read in the viewing area 3.

The viewing area 3 can be designed in different ways. However, the viewing area 3 is in any case designed in such a way that the indicator surface 2 can be viewed through it. This means that the viewing area 3 is transparent or at least partially transparent. In this embodiment, the viewing area is an opening of a non-transparent cover 7 that is located in the second plane 12. The cover 7 extends from the first plane 11 to the second plane 12 and can optionally also partially extend in the second plane 12. A lens 6 is arranged in the opening of the non-transparent cover 7, i.e., in the viewing area 3. This means that the indicator surface 2 is also viewed through the lens 6 when the indicator surface 2 is viewed through the viewing area 3.

A lighting means 9 is arranged on a side of the indicator surface 2 that faces away from the second plane 12. The lighting means 9 is a background lighting means of the indicator surface 2. For example, the indicator surface 2 is illuminated from its rear side, i.e., from a side facing away from the second plane 12. For this purpose, the indicator surface 2 is in particular designed in such a way that it is partially transparent, whereby the indicators 5*a*, 5*b*, 5*c* are illuminated indirectly. However, it is pointed out that, alternatively or additionally, it is also advantageous to directly illuminate the indicator surface 2 starting from its front side, i.e., from the second plane 12.

FIG. 1 also shows the camera system 20, wherein the camera system 20 comprises a position determination unit 21. The latter is configured to read the indicator 13 of the indicator surface 2 that is located in the viewing area 3 of the marking 1 and to ascertain a relative position of the camera system 20 with respect to the marking 1 from the read indicator 13.

FIG. 1 shows the camera system 20 in different positions with respect to the marking 1 in order to explain the functional principle of the marking 1 in more detail. Thus, the marking 1 is viewed by the camera system 20 from a first position and, at another time, the marking 1 is viewed by the camera system 20' from a second position.

From the perspective of the camera system 20, the indicator surface 2 can only be recorded through the viewing area 3 since the other areas of the indicator surface 2 are obscured by the cover 6. Thus, only a particular point of the indicator surface 2 can be seen in the viewing area 3. This point is located at a location of the indicator surface 2 that is defined by the viewing area and the relative position of the camera system 20 to the marking. This point is thus the viewing point 4.

It can be seen that, depending on the position of the camera system 20, a different location of the indicator surface 2 is viewed, i.e., the position of the viewing point 4 changes. When considering the camera system 20' at the second position in FIG. 1, it can be seen that the position of the viewing point 4 has also been changed. Accordingly, the camera system 20 records a different indicator 5*a*, 5*b*, 5*c*, depending on the position of the camera of the camera system 20.

The indicator 13 read via the viewing area 3 is ascertained and recognized by the position determination unit 21, and a relative position of the camera system 20 with respect to the marking 1 is deduced therefrom. For this purpose, different points in a specified plane 31 are in each case assigned an indicator of the different indicators 5*a*, 5*b*, 5*c* of the indicator surface 2. This makes it possible to ascertain a relative position of the camera system 20 with respect to the marking 1 in a specified plane 31. In order to achieve a particularly accurate ascertainment of the position of the camera system 20 with respect to the marking 1, it is advantageous if the marking 1 itself is not arranged in the specified plane 31.

Figure 6:
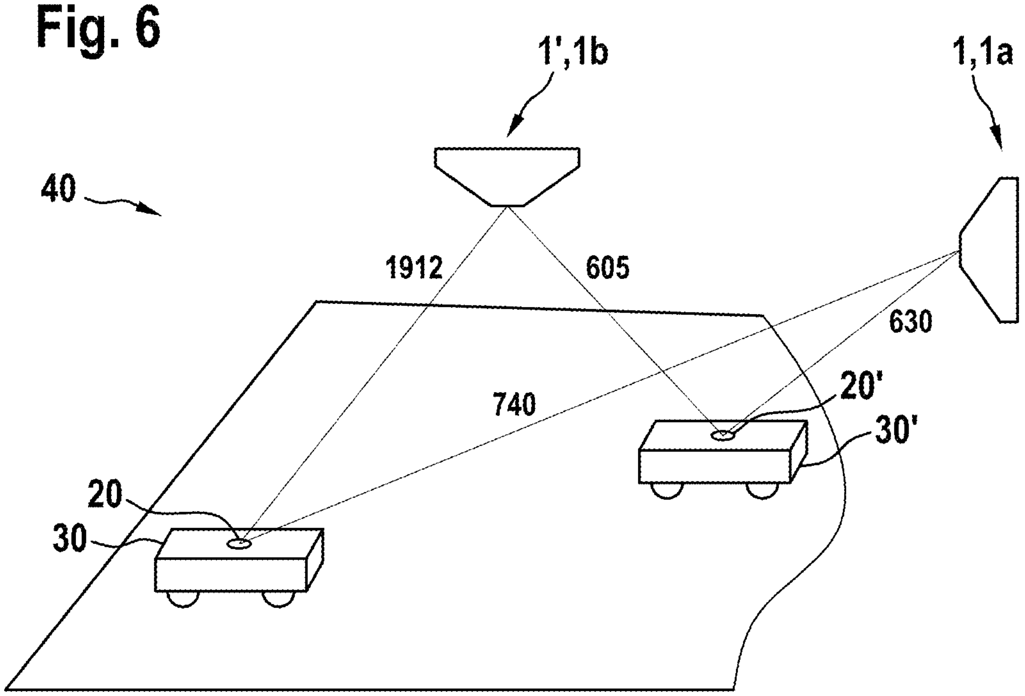
FIG. 6 shows a schematic representation of a positioning system according to an example embodiment of the present invention.

If the camera system 20 is arranged accordingly on a mobile unit 30, position determination of the mobile unit 30 with respect to the marking 1 is made possible. This is shown by way of example in FIG. 6. In FIG. 6, the mobile unit 30 is located in and can move within a specified plane 31. A marking 1 arranged above the plane 11 is recorded by a camera 20 of the mobile unit 30. The marking of the indicator surface 2 that is recognized via the viewing area 3, i.e., one of the indicators 5*a*, 5*b*, 5*c*, is recognized and compared to a list in which each point of the specified plane 31 is assigned exactly one indicator of the indicators 5*a*, 5*b*, 5*c* of the indicator surface 2. Depending on the position in the specified plane 31, another indicator is recorded by the camera system 20. Position determination in the specified plane 31 is thus possible. The specified plane 31 can be defined in different ways. Thus, the specified plane 31 is either a plane in which the mobile unit 30 moves, or a plane in which the camera of the camera system 20 is arranged.

Figure 3:
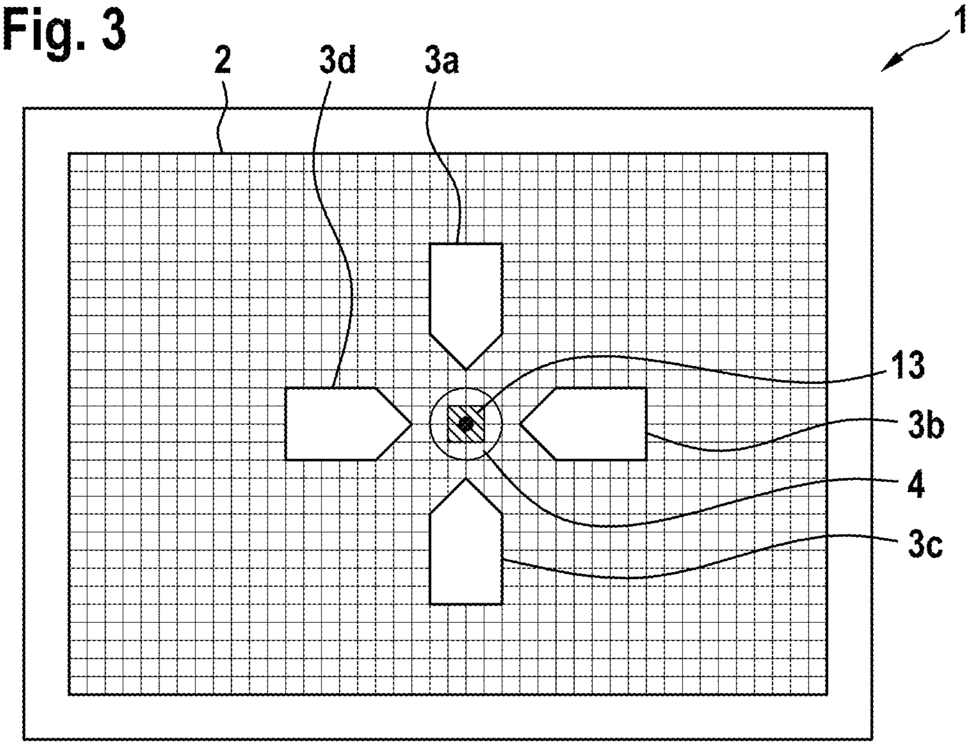
FIG. 3 shows an appearance of a marking according to an example embodiment of the present invention when viewed from a first position.
Figure 4:
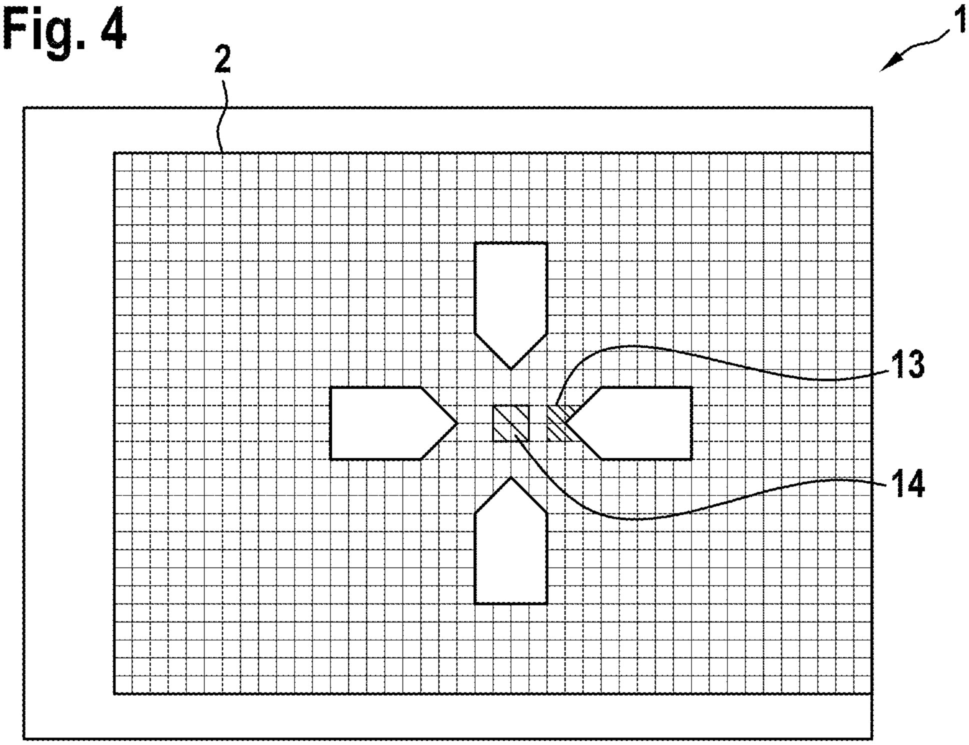
FIG. 4 shows an appearance of the marking according to an example embodiment of the present invention when viewed from a second position.

FIGS. 3 and 4 show exemplary views of the marking 1 from the intended viewing direction 15. It is shown, by way of example, what the marking 1 looks like from the perspective of the camera system 20. However, the viewing area 3 is implemented by a marking on a transparent cover. Thus, a center point of the cover 7 located in the second plane 12 is marked by four arrows 3*a*, 3*b*, 3*c*, 3*d* arranged in a cross. The viewing area 3 is thus marked optically. The indicator surface 2 is also shown in FIGS. 3 and 4. It can be seen that a particular indicator 13 of the indicator surface 2 falls within the viewing area 3 through which the viewing point 4 is defined. The viewing point 4 here is the point of the indicator surface 2 that falls into a center of the cross spanned by the arrows 3*a* to 3*d*.

If a viewer, for example the camera of the camera system 20, moves with respect to the marking 1, another indicator 14 falls into the viewing area 3 and the viewing point 4 defined thereby. For example, a viewing point in the view of the marking 1 that is shown in FIG. 4 is shifted to the left with respect to the viewing points shown in FIG. 3. Thus, in the views of the marking 1 that are shown in FIGS. 3 and 4, different indicators 13, 13' are read from the indicator surface 2. If the marking 1 is not arranged in the viewing plane, the read indicator will also change when approaching the marking 1. The same applies to moving away from the marking 1.

Figure 5:
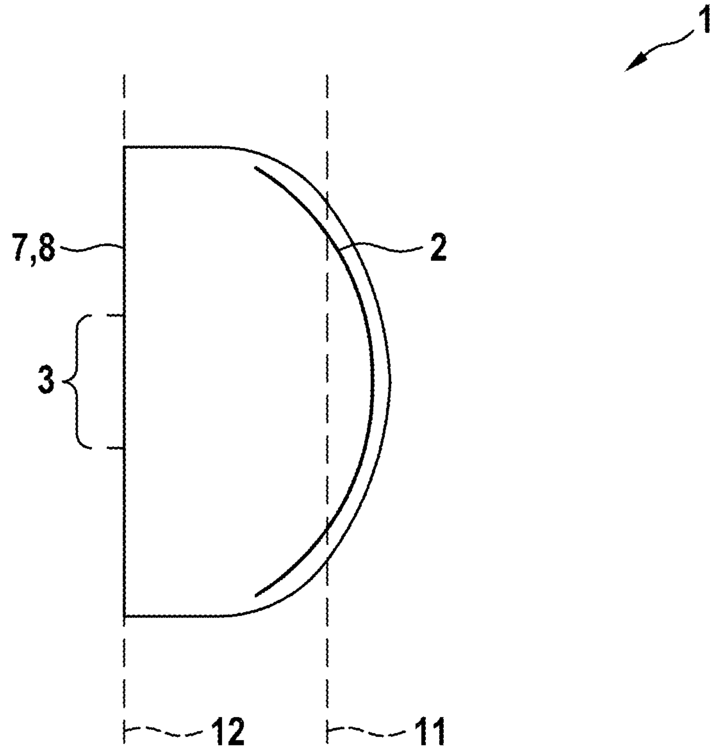
FIG. 5 shows a schematic representation of a marking according to the present invention according to a further embodiment.

FIG. 5 shows an alternative embodiment of the marking 1, which substantially corresponds to the previously described embodiment. However, the indicator surface 2 in this case is curved so that an outer region of the indicator surface 2 is arranged closer to the second plane 12 than an inner region of the indicator surface 2 is. Optionally, this marking 1 also has an associated lighting means 9. The curvature of the indicator surface 2 ensures that the latter can be clearly read even at comparatively steep viewing angles. This results in less distortion of the indicators 5*a*, 5*b*, 5*c* shown on the indicator surface 2. In the embodiment of the marking 1 that is shown in FIG. 5, the viewing area 3 is furthermore designed in such a way that it is an area of a Fresnel lens 8. The Fresnel lens 8 extends into the second plane 12. A center of the Fresnel lens 8 lies in the viewing area 3 and is marked, for example, by a corresponding marking, as is also the case in FIGS. 3 and 4 by way of example. The functional principle of the marking 1 remains the same.

Reference is made to the positioning system 40 shown in FIG. 6. This positioning system comprises at least one of the markings 1 according to the present invention, and the camera system 20, wherein the camera system 20 is arranged on a mobile unit 30. The marking 1 is arranged either on a ceiling or a wall above the specified plane 31 in which the mobile unit 30 moves. If the marking is arranged on the ceiling, the first plane 11 and the second plane 12 are preferably arranged in parallel with a specified plane 31 in which the camera system 20 is moved. If the marking is arranged on the wall, the first plane 11 and the second plane 12 are preferably arranged perpendicularly to a specified plane 31 in which the camera system 20 is moved.

It can be seen that, depending on a relative position of the mobile unit 30 with respect to the marking 1, the camera system 20 has a different viewing angle toward the marking 1. On the basis of the indicator 13 read for a position, the position of the mobile unit 30 in or on the specified plane 31 is deduced.

For this purpose, a method for position determination is performed using the marking 1. In this case, an indicator is read from the indicator surface 2, which is arranged at least partially in a first plane 11, by means of a camera. The indicator located in the viewing area 3 is read. The position of the camera is deduced from the read indicator, with different indicators being assigned different positions.

A ceiling installation is often useful and effective since it results in easy mapping and similar accuracy regardless of the position. A vertical installation is also possible. In general, a combination of the two constellations is also possible. This would improve accuracy and may resolve possible ambiguities.

Preferably, a plurality of the markings 1 according to the present invention, for example a first marking 1*a* and a second marking 1*b*, is therefore arranged in the positioning system 40. The position determination unit 21 is preferably configured to ascertain the relative position of the camera system 20 with respect to the markings 1*a*, 1*b* on the basis of the read indicators 13 of the two markings 1*a*, 1*b*. This also makes it possible to determine a position outside the specified plane 31. Read indicators are shown in FIG. 6 by way of example with the indicators 1912, 605, 740 and 630.

The principle described above is based on a mapping/projection of a 2D texture into 3D space. If this mapping is known, it allows an observer of the apparatus, i.e., the marking 1, to determine in which direction they are located relative to this apparatus. Typically, the room in which the observer moves can be reduced to a plane so that the position can be deduced directly.

A pose is unambiguously determined by six parameters (3 position parameters and 3 orientation parameters). The section visible when observing the marking 1 allows the determination of three parameters. Two parameters describe the view beam which starts from the marking 1 and on which the observer must be located. In addition, the rotation of the marking 1 about this view beam is also known, for example by an alignment of the recognized indicator 13.

Since the observer also knows the angle at which they are observing the apparatus (this requires a calibrated camera system 20), a total of five of six position parameters can be determined. The distance between the observer and the apparatus remains unknown. This degree of freedom can be resolved by including a plane on which the observer is located or by using a second apparatus.

If the calibration of the camera system 20 is not known, only three parameters can be determined. By including a plane (and the distance between the plane and the camera, i.e., the camera height) or a second marking 1, the position can nevertheless be determined unambiguously.

In contrast, at least two to three traditional 2D markers are required to determine the pose, wherein these 2D markers should/must be far apart from one another. In addition, a calibrated camera system is always required. Some advantages of the proposal are listed below.

By including one (or more) planes, the observation of the marking 1, with knowledge of the 2D-3D mapping, allows an observer to determine their own position/orientation.

By using two markings 1, the position of an observer in the room can be determined in 3D (without additional plane assumptions).

The system does not require calibration of the camera system 20. This is only required if all six position parameters are to be determined.

The system is passive (except for a lighting means) and, for its use, requires only the knowledge of the 2D-3D mapping. The position determination is therefore entirely up to the observer.

The apparatus can be manufactured cost-effectively and does not require any expensive components/processes, except for the one-time measurement of the 2D-3D mapping and the determination of the installation pose.

The system can be used in many areas/scenarios. For example, it could also help people to orient themselves in a large hall. In this case, a color pattern would be used, and the apparatus would be mounted on the ceiling. A person could then deduce their position from the observed color.

In order for an observer to be able to determine their position and/or pose, they must, on the one hand, know the 2D-3D mapping between the texture and the corresponding view beams (starting from the apparatus), i.e., for example, at which two solid angles the indicator can be seen. In addition, the pose of the apparatus must be known or defined in relation to a pose reference, such as a map origin of the building.

The texture (number table) shown in FIG. 2 on the indicator surface 2 is easy to interpret for humans but is suboptimal for automatic processing since the image resolution must be relatively high in order to be able to read/distinguish individual numbers. A random pattern with different spatial frequencies is more advantageous, for example. If the observer knows the pattern, common feature extraction algorithms can be used to find the exact position and orientation of the observed pattern section on the overall pattern. Exchanging the pattern information is more complex than the information about the structure of the table. However, it could also be possible to transmit only the information required to generate the pattern of all projectors used (as well as their poses).

Another possibility is to encode the position using color. In this case, a color space would, for example, be spanned so that each color corresponds to a spatial direction. Additionally, reference colors could be placed around the apparatus in order to allow color calibration. A further possibility is the use of a screen or display as an indicator surface 2 with temporally varying content instead of a static texture. For example, different black-and-white patterns, the sequence of which allows an unambiguous position determination (e.g., increasing spatial frequencies of a binary function), could be shown one after the other as an indicator. Finally, the position on the monitor or in the plane could also be encoded and transmitted directly in black-and-white binary over time.

A DOE-based laser projector can also be used. At different viewing directions toward the apparatus, different sections of a random (but known) light pattern or a point structure would then be visible.

Some possible areas of application/scenarios for the positioning system 40 according to the present invention are listed below.

Localization of robots in warehouses or sorting systems

Localization of vehicles in intelligent parking garages

Localization of robot vacuum cleaners or cleaning robots in private or public spaces Automatic alignment/driving of a truck along or with respect to an unloading ramp or gangway to a ship Guidance/Localization system for a hand-held device, e.g., an audio guide in a museum

The invention claimed is:

1. A marking for position determination, comprising:

an indicator surface which is arranged at least partially in a first plane and on which a large number of different indicators is arranged; and a viewing area which is arranged in a second plane located in front of the first plane in an intended viewing direction and which is configured in such a way that the viewing area defines a viewing point through which the indicator surface in the first plane is to be viewed in order to read an indicator from the large number of different indicators.

2. The marking according to claim 1, wherein a lens is arranged in the viewing area.

3. The marking according to claim 1, wherein the viewing area is:

an opening located in the second plane, or a transparent area of a non-transparent or partially transparent cover that is located in the second plane, or a marked area of a transparent cover located in the second plane.

4. The marking according to claim 3, wherein the cover includes a Fresnel lens on which the viewing area is marked.

5. The marking according to claim 4, wherein the marking is used for a position determination.

6. The marking according to claim 1, wherein the indicator surface has a curvature so that an outer region of the indicator surface is arranged closer to the second plane than an inner region of the indicator surface is.

7. The marking according to claim 1, wherein the marking includes a lighting arrangement which is arranged to illuminate the indicator surface.

8. A camera system which is configured to record a marking, the marking including:

an indicator surface which is arranged at least partially in a first plane and on which a large number of different indicators is arranged; and a viewing area which is arranged in a second plane located in front of the first plane in an intended viewing direction and which is configured in such a way that the viewing area defines a viewing point through which the indicator surface in the first plane is to be viewed in order to read an indicator from the large number of different indicators, the camera system comprising:

a position determination unit which is configured to:

read an indicator, located at the viewing point, from the indicator surface through the viewing area of the marking; and ascertain a relative position of the camera system with respect to the marking from the read indicator.

9. The camera system according to claim 8, wherein the position determination unit is configured to ascertain the relative position of the camera system with respect to the marking in a specified plane based on the read indicator, wherein different indicators of the indicator surface are assigned to different points on the specified plane.

10. The camera system according to claim 8, wherein the camera system is configured to record a plurality of markings, and the position determination unit is configured to ascertain the relative position of the camera system with respect to the markings based on the read indicators of the markings.

11. A positioning system, comprising:
a marking including:
an indicator surface which is arranged at least partially in a first plane and on which a large number of different indicators is arranged; and
a viewing area which is arranged in a second plane located in front of the first plane in an intended viewing direction and which is configured in such a way that the viewing area defines a viewing point through which the indicator surface in the first plane is to be viewed in order to read an indicator from the large number of different indicators; and
a camera system including:
a position determination unit which is configured to:
read an indicator, located at the viewing point, from the indicator surface through the viewing area of the marking; and
ascertain a relative position of the camera system with respect to the marking from the read indicator.

12. A method for position determination, comprising the following steps:
reading an indicator from an indicator surface which is arranged at least partially in a first plane and on which a large number of different indicators is arranged, wherein, the indicator is read through a viewing area which is arranged in a second plane located in front of the first plane in an intended viewing direction and is configured in such a way that viewing area defines a viewing point through which the indicator surface in the first plane is to be viewed in order to show the indicator from the large number of different indicators.

* * * * *